United States Patent [19]

Ford

[11] Patent Number: 5,399,666
[45] Date of Patent: Mar. 21, 1995

[54] EASILY DEGRADABLE STAR-BLOCK COPOLYMERS

[75] Inventor: Thomas M. Ford, Greenville, Del.

[73] Assignee: E. I. Du Pont de Nemours and Company, Wilmington, Del.

[21] Appl. No.: 230,994

[22] Filed: Apr. 21, 1994

[51] Int. Cl.$^6$ ............................................. C08G 63/08
[52] U.S. Cl. ................... 528/354; 525/413; 525/415
[58] Field of Search ................ 528/354; 525/413, 415

[56] References Cited

U.S. PATENT DOCUMENTS

| | | | |
|---|---|---|---|
| 5,028,667 | 7/1991 | McLain et al. | 525/415 |
| 5,210,108 | 5/1993 | Spinu | 521/182 |
| 5,225,521 | 7/1993 | Spinu | 528/354 |
| 5,292,859 | 3/1994 | Ford et al. | 528/354 |

FOREIGN PATENT DOCUMENTS 0117538  9/1984  European Pat. Off. ..... C08G 63/08

OTHER PUBLICATIONS

Grijpma, D. W. et al, *Makromol. Chem. Rapid. Commun.*, 14, 155–161, 1992.

*Primary Examiner*—Samuel A. Acquah
*Assistant Examiner*—Shelley A. Dodson

[57] ABSTRACT

Star-block copolymers containing polycaprolactone and polylactide blocks of limited molecular weight are tough, easily degradable polymers. Such copolymers, which are noncrystalline and have glass transition temperatures near or below room temperature, are useful in many packaging and other applications.

13 Claims, No Drawings

EASILY DEGRADABLE STAR-BLOCK COPOLYMERS

FIELD OF THE INVENTION

Disclosed herein are easily hydro- and biodegradable star-block copolymers of caprolactone and lactide. Even though of relatively low molecular weight, the copolymers are tough elastomer-like materials.

TECHNICAL BACKGROUND

Polymers, particularly thermoplastics, are in theory recyclable, but are often not recycled because of the cost of collecting, sorting and purifying the recycled plastics. Therefore, most plastics and other polymers such as elastomers, are disposed of with other trash, such as in landfills, where they are very chemically stable, and degrade minimally. One way of reducing the amount of stable polymers in landfills and the like is to produce polymers which are degradable, as by hydrolysis, biodegradation, or like processes.

It is known that under the proper conditions, polylactide is biodegradable, and polymers containing this repeat unit have been considered desirable for this reason. However, most polylactide polymers are plastics, that is their glass transition temperature (Tg) is above room temperature, and they may be crystalline. Polymers which contain lactide repeat units but yet have elastomeric-like properties would also be desirable.

U.S. Pat. No. 5,210,108 describes foam made from a star shaped polymer containing lactide repeat units. The foams produced are rigid, not elastomeric.

D. W. Grijpma, et al., *Makromol. Chem. Rapid Commun.*, vol. 14, p. 155-161 (1992) report the synthesis of star block copolymers having polylactide blocks and trimethylene carbonate or a mixture of trimethylene carbonate and another lactone block. These copolymers have polylactide Tg's of 50°-55° C.

SUMMARY OF THE INVENTION

This invention concerns, a star-block copolymer, consisting essentially of, a core, 3 to about 20 inner arms of polycaprolactone which are bound to said core, and polylactide outer arms bound to said inner arms, and provided that:

said polylactide is at least 50% by weight of said copolymer;

said polycaprolactone is about 10% to about 50% by weight of said copolymer;

said polycaprolactone and said polylactide do not crystallize upon melt processing; and said polylactide has a glass transition temperature of less than 35° C.

DETAILS OF THE INVENTION

The instant copolymer is a star-block copolymer which contains polycaprolactone and polylactide blocks. The copolymer also contains a core, which is often the "starting point" for the copolymer. The core is originally a multi-functional material usually containing the same number of functional groups as arms which the star copolymer is meant to have. By functional group in this instance is meant a group which either by itself, or by a reaction of the group, forms a site for the initiation of one copolymer chain (an arm of the star). In this case it will initiate the polymerization of caprolactone.

Suitable functional groups for the core include hydroxyl, amino, and sulfhydryl. These may be used in standard ways to initiate the polymerization of caprolactone. For instance, a catalyst such as stannous octoate may be used. Such polymerizations are described in European Patent Application 117,538, which is hereby included by reference. The polymerization may be done neat (no solvent) or with a solvent present.

The polycaprolactone herein is formed from epsilon-caprolactone, which is the monomer. The polycaprolactone forms the "inner arm" of the copolymer herein. An inner arm is the polymer which is attached or bonded to the core. Since the Tg of polycaprolactone is quite low (below 0° C.) this property does not generally affect the rigidity of the product of the invention. However, polycaprolactone does partially crystallize if the molecular weight is high enough. Therefore, the molecular weight of the polycaprolactone blocks should be low enough so that such crystallization does not take place upon melt processing. A useful molecular weight range for the polycaprolactone inner arm is a number average molecular weight of about 800 to about 4000. It is preferred if the polycaprolactone is about 10% to about 40% by weight of the copolymer, more preferred if it is about 15% to about 30% and especially preferred if it is about 18% to about 22% by weight of the copolymer.

When caprolactone is polymerized, the end group is normally a hydroxyl group, which can be used to help initiate the polymerization of lactide. Therefore, the lactide polymer block becomes bound (attached) to the end of the polycaprolactone block, and herein this is called the outer arm. Lactide in the D, L, or meso forms, or any combination thereof, may be used to form the polylactide block. Lactide homopolymer is semicrystalline, and has a Tg of about 55°-60° C. Therefore the polylactide block should be small enough (low in molecular weight) so that the Tg is 35° C. or less, preferably 30° C. or less. A typical useful range of polylactide block sizes is about 1,000 to about 12,000 in number average molecular weight, but this will vary somewhat with the size of the polycaprolactone block. It is preferred that the number average molecular weight of each polylactide block is about 3,000 or more. It is also preferred if the polylactide is at least 70% by weight of the copolymer.

The polylactide block is formed by the polymerization of lactide itself. This polymerization can be carried out in a number of ways, but it is usually done with a catalyst. Stannous octoate is a useful catalyst, but preferred catalysts are selected rare earth metal compounds, such as those disclosed in U.S. Pat. Nos. 5,028,667 and 5,292,859, which are both hereby included by reference. The catalysts disclosed in the latter patent are especially preferred. These polymerizations are carried out neat or with solvent present, but neat (no solvent present) polymerizations are preferred. Polymerization temperatures are not critical, and 0° C. to about 200° C. is a convenient range. The polymerization of the caprolactone and lactide can be done in sequential steps in the same reactor, or the polycaprolactone (attached to the core) star polymer may be isolated and then mixed with lactide to be polymerized to form the final copolymer.

The star-block copolymers herein have 3 to 20 arms, preferably 3 to 10 arms, more preferably 3 to 6 arms, and especially preferably 4 arms.

The copolymers described herein are relatively tough, elastomeric-like materials that are suitable for many uses. Among these uses are liquid food packaging, such as milk pouches, juice pouches, coatings for coated board for refrigerated liquids, and processed meat wrap; dry food packaging such as the outer wrap for boxed foods, as part of a multilayer packaging film, and as the coating on coated board for frozen foods; coating for coated board for fast food, such as for drink cups; other consumer products such as non-woven absorbants for diapers, soft pliable backsheet for diapers, film overwrap for toiletries and personal care products; agricultural products such as mulch film; medical products such as pliable wound dressings and low modulus surgical implants; as a toughening additive for other polymers, such as polymers used for foams or blow molding and a modifier for polymer to be spun into fibers for improved elongation and tenacity; and other uses such as adhesives, film overwrap for animal feed supplements, and artificial snow. The copolymer disclosed herein is particularly useful in these applications because of its biodegradability, toughness, tear strength and soft feel.

The copolymers herein should not be crystalline, i.e., should not have a melting transition of greater than 3 J/g when tested by Differential Scanning calorimetry (see test for Tg below) upon melt processing. The sample for such a test is prepared by injection molding some of the copolymer in question into a 3.2 mm thick plaque, with the mold temperature being about 10° C., and the copolymer having a melt temperature (exiting the screw barrel) of about 150° C.

Molecular weight measurements herein are made by Gel Permeation Chromatography using polystyrene standards. The average molecular weight of a polylactide outer arm is the number average molecular weight of the copolymer times the weight fraction of polylactide in the copolymer divided by the nominal number of arms in the copolymer. Similarly, the average molecular weight of the polycaprolactone inner arm is the number average molecular weight of the copolymer times the weight fraction of polycaprolactone in the copolymer divided by the nominal number of arms in the copolymer.

The glass transition temperature (Tg) of the copolymer (particularly the polylactide blocks) is measured by the following procedure. About 0.5 g of copolymer is dissolved in 5 mL of methylene chloride and the resulting solution is added dropwise to 50 mL of rapidly stirred methanol (this is done to remove any free lactide in the copolymer, which acts as a plasticizer). The precipitated fluff is collected via filtration and/or decantation and dried in vacuo at room temperature. $^1$H-NMR at 300 MHz is used to verify that no residual lactide remains in the copolymer. Differential Scanning Calorimetry (DSC) is performed using a TA Instruments 2100 analyzer, with a 5–10 mg sample in a covered, sealed, standard aluminum pan. The heating rate is 10° C./min. The Tg is taken as the midpoint of the step transition. It is preferred if the Tg of the polylactide in the copolymer is 30° C. or less.

In the following examples, Mn is number average molecular weight and Mw is weight average molecular weight.

GENERAL ANALYTICAL DETAILS

Molecular weights were measured using size exclusion chromatography (SEC, GPC) in THF solvent at 25° C. using polystyrene calibration standards. Residual lactide monomer and total caprolactone contents are measured using $^1$H-NMR at 300 MHz. Physical properties were measured using a Laboratory Microsystems tester at 9.1 kg full scale load range and a crosshead speed of 5.1 cm per minute. The reported values are the mean of at least five determinations. Film samples (0.025–0.050 mm in thickness) were prepared by compression molding at 150° to 180° C. and a pressure of from 6.9 to 34.5 MPa depending on the flow characteristics of the individual polymer sample.

EXAMPLE 1

Synthesis of 14% Caprolactone 4-Arm

Star Block Polylactide

Seven g polycaprolactone tetrol (Lot #17360-10 from Union Carbide, Mn 7240), 41.3 g L-Lactide and 1.7 g of D,L-Lactide were charged under argon to a carefully dried Helicone ® C2V mixer (Atlantic Research Corp.), held at 164° C. After 10 minutes stirring, 0.657 mL of a 0.45M solution (140 Solvent 66/3 from Unocal, hereafter referred to as AMSCO 140) of La(2,2, 6,6-tetramethylheptane-3,5-dionate)$_3$.bis (ethoxyethylether) catalyst was added via syringe. After 15 minutes, the pale yellow, viscous polymer melt was drained and quenched into water. Lactide conversion and caprolactone content by $^1$H-nmr were 92.4, and 11% respectively, and Tg was 27° C. Mn was 40,000 and Mw/Mn was 14 Tensile strength, % elongation and modulus (hereafter referred to as TEM) were 103 MPa, 137%, 448 MPa, respectively, as measured on a compression molded film.

EXAMPLE 2

Synthesis of 10% Caprolactone 3-Arm

Star Block Polylactide

Five g polycaprolactone triol (Lot #16874-95 from Union Carbide, Mn 5260), 43.2 g L-Lactide and 1.8 g of D,L-Lactide were charged under argon to a carefully dried Helicone ® C2V mixer (Atlantic Research Corp.), held at 164° C. After 10 minutes stirring, 0.687 mL of a 0.45M solution (AMSCO 140) of La (2,2,6,6-tetramethylheptane-3,5-dionate)$_3$.bis (ethoxy-ethylether) catalyst was added via syringe. After 15 minutes, the pale yellow, viscous polymer melt was drained and quenched into water. Tg was 19° C. Mn was 39,000, and Mw/Mn was 1.6. TEM=3.5 MPa, 210%, 82.7 MPa.

EXAMPLE 3

Synthesis of 20% Caprolactone 3-Arm

Star Block Polylactide

Ten g polycaprolactone triol (Lot #16874-95 from Union Carbide, Mn 5260), 38.4 g L-Lactide and 1.6 g of D,L-Lactide were charged under argon to a carefully dried Helicone ® C2V mixer (Atlantic Research Corp.), held at 167° C. After 10 minutes stirring, 0.615 mL of a 0.45M solution (AMSCO 140) of La (2,2,6,6-tetramethylheptane-3,5-dionate)$_3$.bis (ethoxyethylether) catalyst was added via syringe. After 15 minutes, the pale yellow, viscous polymer melt was drained and quenched into water. Tg was 20° C. Mn was 63,000 and Mw/Mn was 1.2. TEM=3.5 MPa, 123%, 110 MPa.

EXAMPLE 4

Synthesis of 20% Caprolactone 4-Arm Star Block Polylactide

Ten g polycaprolactone tetrol (Lot #17360-10 from Union Carbide, Mn 7240), 38.4 g L-Lactide and 1.6 g of D,L-Lactide were charged under argon to a carefully dried Helicone® C2V mixer (Atlantic Research Corp.), held at 161° C. After 10 minutes stirring, 0.615 mL of a 0.45M solution (AMSCO 140) of La (2,2,6,6-tetramethylheptane-3,5-dionate)$_3$.bis (ethoxy-ethylether) catalyst was added via syringe. After 15 minutes, the pale yellow, viscous polymer melt was drained and quenched into water. Tg was 10° C. Mn was 36,400 and Mw/Mn was 1.3. TEM=11.7 MPa, 247%, 303 MPa.

EXAMPLE 5

Glass Transition vs. Composition Study

Polycaprolactone tetrol (#arms=4; Lot #17360-10 from Union Carbide, Mn 7240) and lactide in varying amounts were charged to flame-dried Pyrex® test tubes in a nitrogen filled glove-box, capped with rubber septa, and heated in a vapor bath at 140° or 166° C. After allowing 5 minutes for the molten monomer mixture to come to temperature, La(2,2,6,6-tetramethylheptane-3,5-dionate)$_3$.bis (ethoxy-ethylether) catalyst was added via long-needle microsyringe with vigorous shaking. When the polymerization was complete, as evidenced by high viscosity, a small sample was removed and quenched into water and dried. The polymers were then dissolved at room temperature in dichloromethane and precipitated with rapid stirring into 5 volumes of methanol, in order to remove residual lactide monomers. The compositions and analytical results are shown below.

| Sample | Tetrol (g) | Lactide | % CL[1] | Catalyst (μL) | Rxn (°C.) | Mn (GPC) | Tg (°C.) |
|---|---|---|---|---|---|---|---|
| 1 | 2.8 | 7.2 | 25.6 | 74 | 140 | 36000 | 25 |
| 2 | 2.6 | 7.4 | 24.3 | 76 | 140 | 38100 | 23 |
| 3 | 2.4 | 7.6 | 20.4 | 78 | 140 | 42400 | 25 |
| 4 | 2.2 | 7.8 | 20.5 | 80 | 140 | 46200 | 28 |
| 5 | 2.0 | 8.0 | 19.7 | 82 | 140 | 45000 | 30 |
| 6 | 1.8 | 8.2 | 16.7 | 84 | 140 | 51500 | 34 |
| 7 | 1.6 | 8.4 | 14.7 | 86 | 140 | 54400 | 36 |

[1] % CL = wt % caprolactone, by [1]H-nmr

EXAMPLE 6

Synthesis of 22% Caprolactone 4-Arm Star Block Polylactide

Eleven g of polycaprolactone tetrol (Lot #17360-10 from Union Carbide, Mn 7240) and 39 g L-Lactide were charged under argon to a carefully dried Helicone® C2V mixer (Atlantic Research Corp.), held at 167° C. After 10 minutes stirring, 0.615 mL of a 0.45M solution (AMSCO 140) of La (2,2,6,6-tetramethylheptane-3,5-dionate)$_3$.bis (ethoxy-ethylether) catalyst was added via syringe. After 15 minutes, the pale yellow, viscous polymer melt was drained and quenched into water. Lactide conversion and caprolactone content by [1]H-nmr were 95.1, and 22% respectively, and Tg was 18° C. Mn was 34,200 and Mw/Mn was 1.3. TEM=13.1 MPa, 94%, 351 MPa.

EXAMPLE 7

Synthesis of 24% Caprolactone 4-Arm Star Block Polylactide

Twelve g polycaprolactone tetrol (Lot #17360-10 from Union Carbide, Mn 7240) and 38 g L-Lactide were charged under argon to a carefully dried Helicone® C2V mixer (Atlantic Research Corp.), held at 163° C. After 10 minutes stirring, 0.615 mL of a 0.45M solution (AMSCO 140) of La (2,2,6,6-tetramethylheptane-3,5-dionate)$_3$.bis (ethoxy-ethylether) catalyst was added via syringe. After 15 minutes, the pale yellow, viscous polymer melt was drained and quenched into water. Lactide conversion and caprolactone content by [1]H-nmr were 92.8, and 25% respectively, and Tg was 16° C. Mn was 32,200 and Mw/Mn was 1.3. TEM=9.7 MPa, 84%, 214 MPa.

EXAMPLE 8

Synthesis of 20% Caprolactone 4-Arm Star Block Polylactide

Ten g polycaprolactone tetrol (Lot #17360-10 from Union Carbide, Mn 7240) and 40 g L-Lactide were charged under argon to a carefully dried Helicone® C2V mixer (Atlantic Research Corp.), held at 167° C. After 15 minutes stirring, 0.615 mL of a 0.45M solution (AMSCO 140) of La (2,2,6,6-tetramethylheptane-3,5-dionate)$_3$.bis (ethoxy-ethylether) catalyst was added via syringe. After 15 minutes, the pale yellow, viscous polymer melt was drained and quenched into water. Lactide conversion and caprolactone content by [1]H-nmr were 94.8, and 21% respectively, and Tg was 23° C. Mn was 38,300 and Mw/Mn was 1.4. TEM=14.5 MPa, 316%, 503 MPa.

EXAMPLE 9

Synthesis of 20% Caprolactone 4-Arm Star Block Polylactide (Tin Octoate Catalyst)

One g polycaprolactone tetrol (Lot #17360-10 from Union Carbide, Mn 7240) and 4 g L-Lactide were charged to a flame-dried Pyrex® test tube in a nitrogen filled glove-box, capped with rubber septa, and heated in a vapor bath at 166° C. After allowing 5 minutes for the molten mixture to come to temperature, 37 microliters of a 0.49M toluene solution of stannous octoate catalyst was added via long-needle microsyringe with vigorous shaking. When the polymerization was complete, as evidenced by high viscosity, a small sample was removed and quenched into water and dried. Lactide conversion and caprolactone content by [1]H-nmr were 94.3 and 17.8% respectively, and Tg was 25° C. Mn was 49,100 and Mw/Mn was 1.2.

What is claimed is:

1. A star-block copolymer, consisting essentially of, a core, 3 to about 20 inner arms of polycaprolactone which are bound to said core, and polylactide outer arms bound to said inner arms, and provided that:
    said polylactide is at least 50% by weight of said copolymer;
    said polycaprolactone is about 10% to about 50% by weight of said copolymer;
    said polycaprolactone and said polylactide do not crystallize upon melt processing; and
    said polylactide has a glass transition temperature of less than 35° C.

2. The star-block copolymer according to claim 1 wherein a number average molecular weight for each of the inner arms of polycaprolactone is about 800 to about 4000.

3. The star-block copolymer according to claim 1 wherein the polycaprolactone is about 15% to 30% by weight of the star-block copolymer.

4. The star-block copolymer according to claim 2 wherein the polycaprolactone is about 18% to about 22% by weight of the star-block copolymer.

5. The star-block copolymer according to claim 1 wherein a number average molecular weight for each of the polylactide outer arms is about 1,000 to about 12,000.

6. The star-block copolymer according to claim 5 wherein a number average molecular weight of each of the polylactide outer arms is about 3,000 or more.

7. The star-block copolymer according to claim 1 wherein the polylactide is at least 70% by weight of the copolymer.

8. The star-block copolymer according to claim 1 wherein the star-block copolymer has 3 to 10 arms.

9. The star-block copolymer according to claim 8 wherein the star-block copolymer has 3 to 6 arms.

10. The star-block copolymer according to claim 9 wherein the star-block copolymer has 4 arms.

11. The star-block copolymer according to claim 4 wherein the star-block copolymer has 4 arms.

12. The star-block copolymer according to claim 1 wherein said glass transition temperature is 30° C. or less.

13. The star-block copolymer according to claim 11 wherein said glass transition temperature is 30° C. or less.

* * * * *